US010454373B2

(12) United States Patent
Gurlahosur

(10) Patent No.: US 10,454,373 B2
(45) Date of Patent: Oct. 22, 2019

(54) MULTIPHASE BUCK CONVERTER WITH CURRENT BALANCING

(71) Applicant: TEXAS INSTRUMENTS INCORPORATED, Dallas, TX (US)

(72) Inventor: Sanjay Gurlahosur, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/810,984

(22) Filed: Nov. 13, 2017

(65) Prior Publication Data
US 2019/0149047 A1    May 16, 2019

(51) Int. Cl.
*H02M 3/158* (2006.01)

(52) U.S. Cl.
CPC .................... *H02M 3/1584* (2013.01)

(58) Field of Classification Search
CPC ....... H02M 3/1584; H02M 2003/1586; H02M 3/142
USPC ........................................ 323/268, 271, 272
See application file for complete search history.

(56) References Cited

U.S. PATENT DOCUMENTS

| 6,534,960 B1* | 3/2003 | Wells ................ H02M 3/1584 323/222 |
| 2004/0085789 A1* | 5/2004 | Lipcsei ............... H02M 3/156 363/127 |
| 2005/0010825 A1* | 1/2005 | Pullen ............... H02M 3/1584 713/300 |
| 2005/0226018 A1* | 10/2005 | Chen ................. H02M 3/1584 363/132 |
| 2014/0111179 A1* | 4/2014 | Couleur ............ H02M 3/1584 323/312 |
| 2017/0324332 A1* | 11/2017 | Molari ............... H02M 3/1584 |

* cited by examiner

*Primary Examiner* — Alex Torres-Rivera
(74) *Attorney, Agent, or Firm* — Tuenlap Chan; Charles A. Brill; Frank D. Cimino

(57) ABSTRACT

A multi-phase buck voltage regulator includes first and second buck converters, first and second low pass filters, and a current balancing loop circuit. The first buck converter includes a first pair of power transistors and a first switch node. The second buck converter includes a second pair of power transistors and a second switch node. The low pass filters are coupled to their respective switch nodes. The current balancing loop circuit receives a filtered output of each filter. The current balancing loop generates a current balancing current signal to control a gain of a first voltage-to-current converter for the second buck converter. The duty cycle of the second buck converter is thereby adjusted, which in turn adjusts a current of the second buck converter to become closer to a current of the first buck converter.

13 Claims, 2 Drawing Sheets

MULTIPHASE BUCK CONVERTER WITH CURRENT BALANCING

BACKGROUND

A voltage converter generates a regulated output voltage based on an input voltage. The output voltage can be used to a power a load. A buck converter is a type of voltage converter. A buck converter includes a pair of power transistors (or a diode can be substituted for one of the power transistors) that are toggled on and off by a pulse width modulation (PWM) controller. An inductor is connected to the power transistors and an output capacitor is connected to the inductor.

In today's computing environment, central processing units (CPUs), field programmable gate arrays (FPGAs), application specific integrated circuits (ASICs) and even peripherals are growing increasingly complex and, in turn, so do their power delivery requirements. To handle the higher demands, multiphase voltage regulators are becoming increasingly common in many areas of computing including laptops, tablets, servers, etc. A multiphase buck regulator includes a parallel set of buck power stages, each stage with its own pair of power transistors and inductor. Collectively, these components are referred to as a "phase." These phases are connected in parallel and share the output capacitor. The phases are operated by a controller in such a way that while one phase is active, the other phase(s) is inactive.

SUMMARY

In some embodiments, a multi-phase buck voltage regulator includes a first buck converter, a second buck converter, a first low pass filter, a second low pass filter, and a current balancing loop circuit. The first buck converter includes a first pair of power transistors connected together at a first switch node. The second buck converter includes a second pair of power transistors connected together at a second switch node. The first low pass filter is coupled to the first switch node. The second low pass filter is coupled to the second switch node. The current balancing loop circuit receives a filtered output of each of the first and second low pass filters. The current balancing loop generates a current balancing current signal to control a gain of a first voltage-to-current converter for the second buck converter. The duty cycle of the second buck converter is thereby adjusted, which in turn adjusts a current of the second buck converter to become closer to a current of the first buck converter.

In another embodiment, a multi-phase buck voltage regulator includes a first buck converter including a first pair of power transistors connected together at a first switch node, and a second buck converter including a second pair of power transistors connected together at a second switch node. The regulator also includes a current balancing loop circuit to receive a first signal indicative of the voltage on the first switch node and a second signal indicative of the voltage on the second switch node and to dynamically cause a duty cycle of the second buck converter to be altered to thereby reduce a difference between the current of the second buck converter and the current of the first buck converter.

In yet another embodiment, a multi-phase buck voltage regulator includes a first buck converter, an offset current source, a second buck converter, a first low pass filter, a second low pass filter, and a current balancing loop circuit. The first buck converter includes a pulse width modulation comparator and a first pair of power transistors connected together at a first switch node. The offset current source is coupled to the pulse width modulation comparator. The second buck converter includes a second pair of power transistors connected together at a second switch node. The first low pass filter is coupled to the first switch node. The second low pass filter is coupled to the second switch node. The current balancing loop circuit receives a filtered output of each of the first and second low pass filters and generates a current balancing current signal to control a gain of a first voltage-to-current converter for the second buck converter to thereby adjust a duty cycle of the second buck converter so that a current of the second buck converter to become closer to a current of the first buck converter

BRIEF DESCRIPTION OF THE DRAWINGS

For a detailed description of various examples, reference will now be made to the accompanying drawings in which.

DETAILED DESCRIPTION

The disclosed embodiments are directed to a multi-phase buck voltage regulator. In one example, the multi-phase buck voltage regulator comprises a two-phase buck voltage regulator, but the disclosed principles can be extended to any number of phases. The multi-phase buck voltage regulator includes first buck converter including a first pair of power transistors connected together at a first switch node and a second buck converter including a second pair of power transistors connected together at a second switch node. A separate inductor can be connected to each switch node. One terminal of each inductor is connected to the respective switch node and the opposing terminals of the inductors are connected together to form the output voltage node for the regulator.

The multi-phase buck voltage regulator further comprises a first low pass filter coupled to the first switch node and a second low pass filter coupled to the second switch node. A current balancing loop circuit also is included to receive a filtered output of each of the first and second low pass filters and to generate a current balancing current signal to control a gain of a first voltage-to-current converter for the second buck converter to thereby adjust a duty cycle of the second buck converter. By adjusting the duty cycle of the second buck converter, the average current produced by the second buck converter can be more closely matched to that of the first buck converter.

Figure 1:
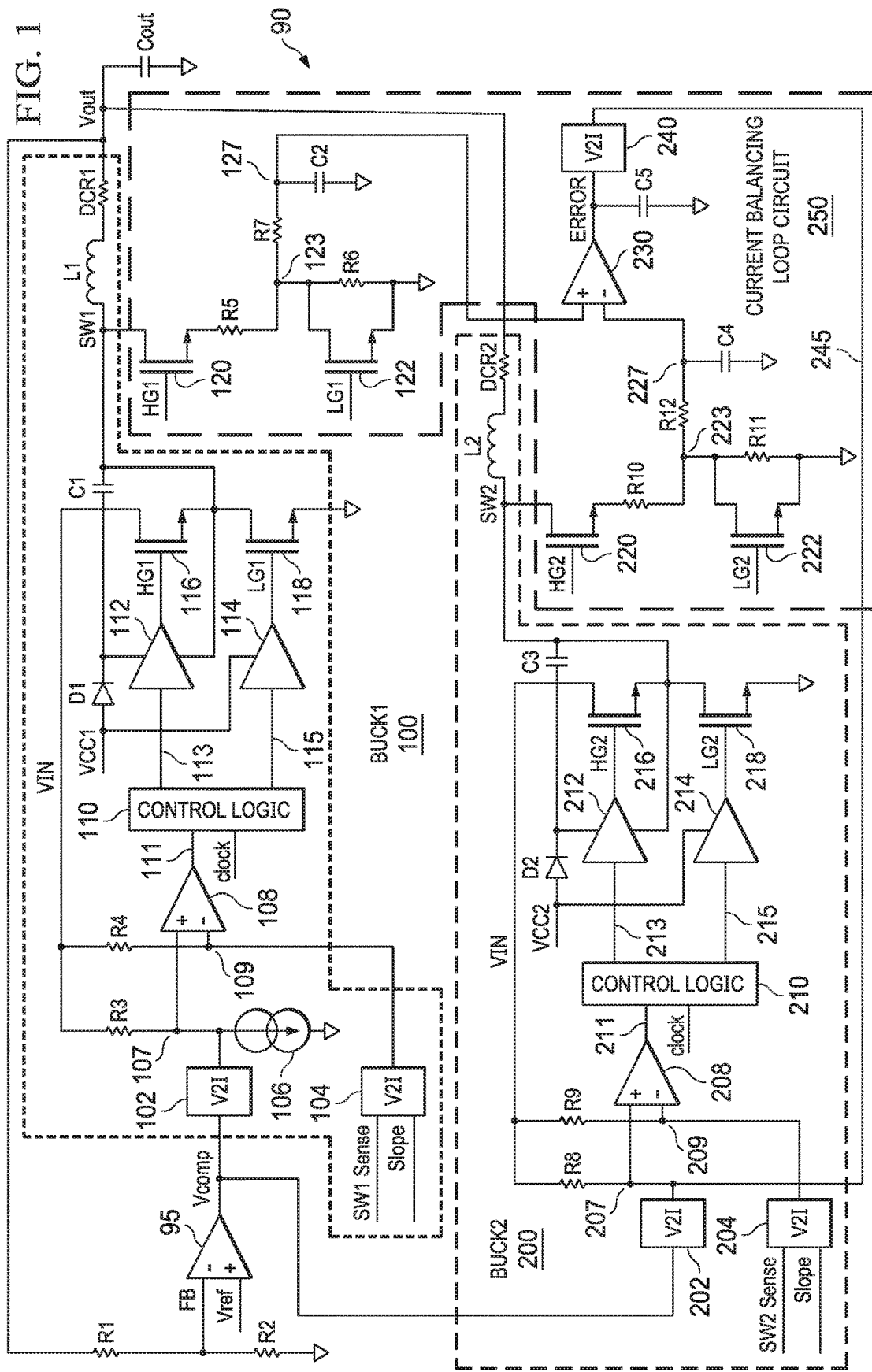
FIG. 1 illustrates a multi-phase buck voltage regulator in accordance with an embodiment.

FIG. 1 shows an example of a two-phase buck voltage regulator 90 with the current balancing noted above. The two-phase buck voltage regulator 90 generates an output voltage on an output voltage node VOUT based on an input voltage from the input voltage node VIN. In general, VOUT is less than VIN. The illustrated buck voltage regulator 90 includes two buck converters designated as BUCK1 100 and BUCK2 200 and a current balancing loop circuit 250. The architecture of each buck converter is similar, although not identical in this embodiment.

BUCK1 includes a voltage-to-current converter (V2I) 102, a V2I 104, resistors R3 and R4, an offset current source 106, a PWM comparator 108, control logic 110, diode D1, capacitor C1, drivers 112 and 114, high side power transistor 116, low side power transistor 118, and inductor L1. An active switch can be included instead of a diode (D1). The resistance DCR1 represents the direct current (DC) resistance of the inductor L1. The V2I 102 is connected to the offset current source 106 and resistor R3. The offset current source 106 sources a current from node 107 to ground. The offset current value of the offset current source may be fixed and is further described below. The opposing side of R3 is tied to the input voltage node VIN. Resistor R4 also is connected to the input voltage node VIN and to the V2I 104 to form a node 109. Nodes 107 and 109 are connected to the PWM comparator 108, which generates an output signal 111 which is high if the voltage on node 107 is higher than the voltage on node 109, or low if the voltage on node 107 is less than the voltage on node 109. The output signal 111 from the PWM comparator is supplied to control logic 110, which generates output signals 113 and 115 to drivers 112 and 114, respectively. The output signals 113, 115 dictate whether the corresponding power transistor 116, 118 is to be turned on or off. Driver 112 receives output signal 113 and asserts a high side gate drive signal (HG1) to high side power transistor 116 to turn the transistor on and off. Similarly, driver 114 receives output signal 115 and asserts a low side gate drive signal (LS1) to low side power transistor 116 to turn the transistor on and off.

The drain of the high side power transistor 116 is tied to the input voltage node VIN, and the source of the low side power transistor 118 is tied to ground. The source of the high side power transistor 116 and the drain of the low side power transistor 118 are connected together to define a switch node SW1. Inductor L1 is connected to switch node SW1 and to an output capacitor Cout.

BUCK2 is similarly configured. BUCK2 includes a V2I 202, a V2I 204, resistors R8 and R9, a PWM comparator 208, control logic 210, diode D2 (or active switch), capacitor C3, drivers 212 and 214, high side power transistor 216, low side power transistor 218, and inductor L2. The resistance DCR2 represents the DC resistance of the inductor L2. The V2I 202 is connected through a node 207 to resistor R8 and to the current balancing loop circuit 250 (discussed below). The opposing side of R8 is tied to the input voltage node VIN. Resistor R9 also is connected to the input voltage node VIN and to the V2I 204 to form a node 209. Nodes 207 and 209 are connected to the PWM comparator 208, which generates an output signal 211 which is high if the voltage on node 207 is higher than the voltage on node 209, or low if the voltage on node 207 is less than the voltage on node 209. The output signal 211 from the PWM comparator is supplied to control logic 210, which generates output signals 213 and 215 to drivers 212 and 214, respectively. The output signals 213, 215 dictate whether the corresponding power transistor 216, 218 is to be turned on or off. Driver 212 receives output signal 213 and asserts a high side gate drive signal (HG2) to high side power transistor 216 to turn the transistor on and off. Similarly, driver 214 receives output signal 215 and asserts a low side gate drive signal (LS2) to low side power transistor 216 to turn the transistor on and off.

The drain of the high side power transistor 216 is tied to the input voltage node VIN, and the source of the low side power transistor 218 is tied to ground. The source of the high side power transistor 216 and the drain of the low side power transistor 218 are connected together to define a switch node SW2. Inductor L2 is connected to switch node SW2 and to the output capacitor Cout. As such, BUCK1 and BUCK 2 have their own inductors L1, L2, but share a common output capacitor Cout.

The output voltage node VOUT is connected to a resistor divider comprising resistors R1 and R2 to generate a feedback voltage (FB) to an error amplifier 95. The resistor divider generates a divided down version of the output voltage as a feedback voltage to the negative input of the error amplifier 95. The positive input of the error amplifier is a reference voltage Vref. The output of the error amplifier 95 is a compensation voltage designated as Vcomp. The Vcomp voltage is provided to the inputs of both V2I 102 and V2I 202 of the buck converters.

Two or more of the components shown in the example circuit of FIG. 1 may be integrated on a common semiconductor die and thus be part of the same chip. In one example, both the BUCK1 and BUCK2 converters are integrated together in the same semiconductor package. The inductors L1 and L2 may be integrated with the respective buck converters in the same semiconductor package, or may be provided as separate components to the rest of the buck converters and mounted to the same circuit board as the chip containing the buck converters. Similarly, the output capacitor Cout may be a component separate from the buck converters and placed on the same circuit board, or integrated into the same semiconductor package as the buck converters. The high side power transistors 116, 216 and low side power transistors 118, 218 may be integrated into the same semiconductor package with the rest of the components of the buck converters, or may be provided separately.

As noted above, the current through each active phase of a multi-phase buck regulator (e.g., the average current through each phase's inductor) should be evenly balanced. Evenly balancing the current between active phases helps to avoid thermally stressing any one phase and provide optimal ripple cancellation. The current balancing loop circuit 250 low pass filters the voltages on, or derived from, the switch nodes SW1 and SW2. The current balancing loop circuit 250 compares the filtered voltages to generate an error signal, and uses the error signal to adjust the gain of V2I 202 of BUCK2 to dynamically adjust its inductor current to reduce the error signal and thus force the inductor current of BUCK2 to be closer to the inductor current of BUCK1.

In the example of FIG. 1, the current balancing loop 250 includes a voltage divider comprising serially-connected resistors R5 and R6 coupled between switch node SW1 and ground. Node 123 represents the connection point between the resistors. The voltage divider divides down the voltage on the switch node SW1, which may be helpful as the switch node voltage can become fairly large. If such is not the case, other embodiments may not include a voltage divider.

Transistor switches 120 and 122 are connected to resistors R5 and R6 as shown. Transistor switch 120 is connected between the switch node SW1 and resistor R5. When transistor switch 120 is on, the switch node voltage is coupled to resistor R5. When transistor switch 120 is off, the switch node SW1 is disconnected from resistor R5. Transistor switch 122 is connected in parallel across resistor R6. When transistor switch 122 is on, the resistor R6 is effectively shorted and the voltage on node 123 is zero.

Transistor switch 120 is controlled using the same gate control signal HG1 as the high side power transistor 116. Similarly, transistor switch 122 is controlled using the same gate control signal LG1 as the low side power transistor 118. As such, transistor switches 120 and 122 are turned on and off with the same timing as their counterpart power transistors 116 and 118. Thus, when the high side power transistor 116 is on and low side power transistor 118 is off (which also means that transistor switch 120 is on and transistor switch 122 is off), the switch node voltage is divided down by resistors R5 and R6 and a divided-down voltage is present on node 123. When the high side power transistor 116 is off and low side power transistor 118 is on (which also means that transistor switch 120 is off and transistor switch 122 is on), the voltage on node 123 is zero. Thus, the voltage waveform on node 123 mirrors that of the switch node SW1 albeit at a lower amplitude.

A similar voltage divider circuit is included as part of the current balancing loop circuit 250 for BUCK2 as well. The voltage divider comprising serially-connected resistors R10 and R11 coupled between switch node SW2 and ground. Node 223 represents the connection point between the resistors. The voltage divider divides down the voltage on the switch node SW2. Transistor switches 220 and 222 are connected to resistors R10 and R11 as shown. Transistor switch 220 is connected between the switch node SW2 and resistor R10. When transistor switch 220 is on, the switch node voltage is coupled to resistor R10. When transistor switch 220 is off, the switch node SW2 is disconnected from resistor R10. Transistor switch 222 is connected in parallel across resistor R11. When transistor switch 222 is on, the resistor R11 is effectively shorted and the voltage on node 223 is zero.

Transistor switch 220 is controlled using the same gate control signal HG2 as the high side power transistor 216. Similarly, transistor switch 222 is controlled using the same gate control signal LG2 as the low side power transistor 218. As such, transistor switches 220 and 222 are turned on and off with the same timing as their counterpart power transistors 216 and 218. Thus, when the high side power transistor 216 is on and low side power transistor 218 is off (which also means that transistor switch 220 is on and transistor switch 222 is off), the switch node voltage is divided down by resistors R10 and R11 and a divided-down voltage is present on node 223. When the high side power transistor 216 is off and low side power transistor 218 is on (which also means that transistor switch 220 is off and transistor switch 222 is on), the voltage on node 223 is zero. Thus, the voltage waveform on node 223 mirrors that of the switch node SW2 albeit at a lower amplitude.

The voltage of the switch node SW1, or a voltage derived therefrom (e.g., through the voltage divider comprising resistors R5 and R6, is provided to a low pass filter comprising resistor R7 and capacitor C2. The resistance value of R7 and capacitance value of C2 are selected appropriate for the particular application. In one embodiment, R7 is a 2 megaohm resistor and C2 is a 20 picofarad capacitor, but the values can be different than that in other embodiments. The R7/C2 low pass filter generates a voltage on node 127 that is the average of the switch node voltage (or the voltage derived therefrom). If the average switch node voltage is proportional to the average inductor current, and thus is used as a proxy for the average inductor current.

Similarly, the voltage of the switch node SW2, or a voltage derived therefrom (e.g., through the voltage divider comprising resistors R10 and R11, is provided to a low pass filter comprising resistor R12 and capacitor C4. The resistance value of R12 and capacitance value of C4 are selected as noted above as appropriate for the particular application, are 2 megaohms and 20 picofarads in one embodiment (but different than that in other embodiments). The R12/C4 low pass filter generates a voltage on node 227 that is the average of the switch node voltage (or the voltage derived therefrom). If the average switch node voltage is proportional to the average inductor current, and thus is used as a proxy for the average inductor current.

The outputs of the low pass filters (voltages on nodes 127 and 227) are provided to inputs of an error amplifier 230. In the example of FIG. 1, node 127 is provided to the positive input of the error amplifier 230 and node 227 is provided to the negative input of the error amplifier. The error amplifier 230 integrates the difference between the outputs of the low pass filters of BUCK1 and BUCK2 to produce an error voltage (Error).

Figure 2:
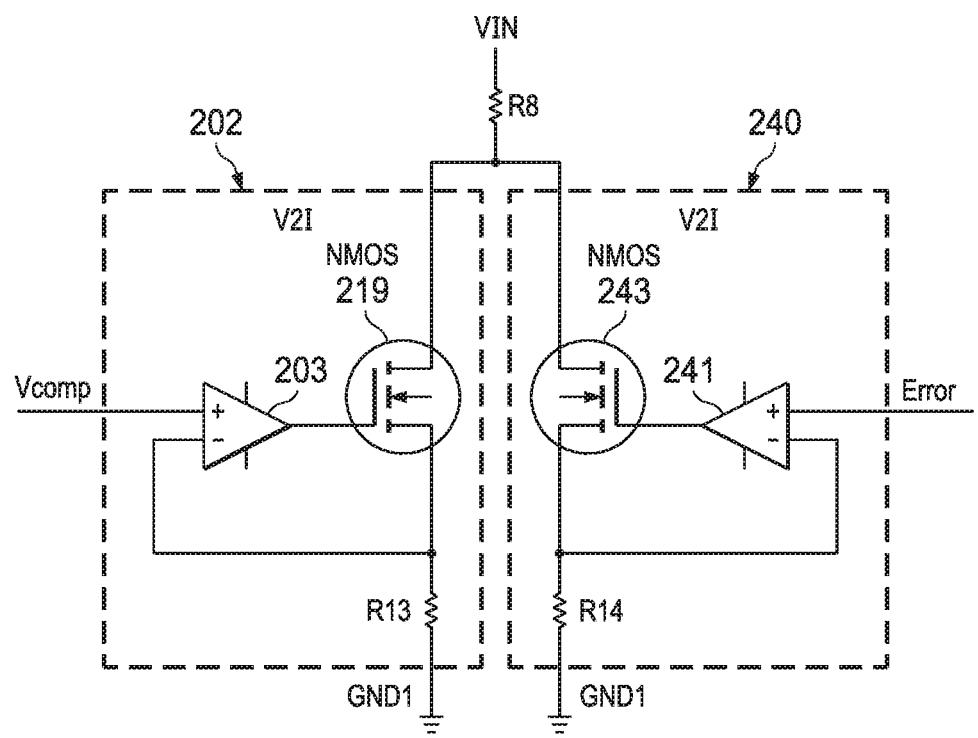
FIG. 2 illustrates an implementation of several voltage-to-current converters within the multi-phase buck voltage regulator of FIG. 1 in accordance with an embodiment.

The output signal from the error amplifier 230 is provided to a V2I 240 and capacitor C5. The V2I 240 converts the integrated signal to a current 245. Current 245 is coupled to the output of V2I 202 and resistor R8. FIG. 2 shows an example of an implementation of V2I 202 and V2I 240. In this example, V2I 240 includes an operational amplifier (op amp) 241 and resistor R14 connected between the output of the op amp and ground. The resistor R14 is also connected to the negative (inverting) input of the op amp. The Error input voltage is provided to the positive (non-inverting) input of the op amp 241. A n-type metal oxide semiconductor field effect transistor (NMOS) connects to the output of the op amp 241 and to a resistor R8 and resistor R14.

V2I 202 has a similar configuration and includes an op amp 203, a resistor R13 connected between the output of op amp 203 and ground, and an NMOS transistor 219. The resistor R13 is also connected to the negative (inverting) input of the op amp. The Vcomp input voltage is provided to the positive (non-inverting) input of the op amp. Resistor R13 and the output of op amp 203 is connected to resistor R8 through the NMOS transistor 219. The other V2I's 102, 104, and 204 in FIG. 1 also may be implemented as an op amp and resistor as illustrated in FIG. 2.

If the average current through BUCK1's inductor L1 is greater than the average current through BUCK2's inductor L2, the Error signal will be positive. The output of op amp 241 tracks the positive input voltage (Error) and thus the voltage on the op amp's output will be the Error voltage as well. Similarly, the output of op amp 203 tracks the Vcomp input voltage. Both voltages causes a currents to flow through resistors R8 and R13, As a result, the input voltage to PWM comparator 208 is influenced by the Error voltage and thus causes the duty cycle of BUCK 2 to be altered (i.e., increased in the scenario in which the average current through BUCK1's inductor L1 is greater than the average current through BUCK2's inductor L2). Consequently, with the duty cycle increased for BUCK2, the average current through L2 increases to thereby balance the current of the two buck converters. Similarly, if the average current through BUCK1's inductor L1 is less than the average current through BUCK2's inductor L2, the duty cycle of BUCK2 is decreased to thereby lower the average current of L2. The offset current source 106 of BUCK1 facilitates the operation of the circuit in the case in which the average current through BUCK1's inductor L1 is less than the average current through BUCK2's inductor L2. The added offset current of current source 106 provides sufficient current swing to permit BUCK2's average inductor current to be lowered to match that of BUCK1.

The average voltage of SW1 equals VOUT plus the product of the current through L1 times DCR1. Similarly, the average voltage of SW2 equals VOUT plus the product of the current through L2 times DCR2. As explained above, the current balancing loop circuit 250 functions to balance the average voltages of SW1 and SW2. If the switch node voltages are equal, then the product of the current through L1×DCR1 will equal the product of the current through L2×DCR2. If the DC resistor (DCR) of both inductors are the same, then, with the operation of the current balancing loop circuit 250, the average current through the inductors L1 and L2 of BUCK1 and BUCK2, respectively, will be balanced. The current balancing loop circuit 250 thus helps to reduce the difference between the average currents of L1 and L2.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
a first low pass filter configured to couple to a first switch node of a first buck converter;
a second low pass filter configured to couple to a second switch node of a second buck converter; and
a current balancing loop circuit to receive a filtered output of each of the first and second low pass filters and to determine an error by developing a difference between the filtered outputs of the first and second low pass filters, and to generate a current balancing current signal to adjust an output of a first voltage-to-current converter for the second buck converter, the adjusted output of the first voltage-to-current converter is configured to adjust a duty cycle of the second buck converter and adjust a current of the second buck converter to track a current of the first buck converter.

2. The apparatus of claim 1, wherein the current balancing loop comprises an error amplifier coupled to the filtered outputs of each of the first and second low pass filters and having an output coupled to a second voltage-to-current converter.

3. The apparatus of claim 2, wherein the error amplifier is to compare the filtered outputs of each of the first and second low pass filters to generate a comparator output voltage, and wherein the comparator output voltage is converted to the current balancing current signal by the second voltage-to-current converter.

4. The apparatus of claim 1, further comprising:
a first voltage divider configured to couple to the first switch node of the first buck converter to provide a divided down voltage to the first low pass filter; and
a second voltage divider configured to couple to the second switch node of the second buck converter to provide a divided down voltage to the second low pass filter.

5. The apparatus of claim 4, wherein:
the first buck converter includes a first pair of power transistors that comprises a first high side transistor coupled to the input voltage node and a first low side transistor coupled to the common node;
the second buck converter includes a second pair of power transistors that comprises a second high side transistor coupled to an input voltage node and a second low side transistor coupled to a common node; and
the first voltage divider includes serially connected first and second resistors and the second voltage divider includes serially connected third and fourth resistors.

6. The apparatus of claim 5, further comprising:
a third transistor coupled between the first switch node and the first resistor and a fourth transistor connected across the second resistor, wherein the third transistor is controlled by a control signal that controls the first high side transistor and wherein the fourth transistor is controlled by a control signal that controls the first low side transistor; and
a fifth transistor coupled between the second switch node and the third resistor and a sixth transistor connected across the fourth resistor, wherein the fifth transistor is controlled by a control signal that controls the second high side transistor and wherein the sixth transistor is controlled by a control signal that controls the second low side transistor.

7. The apparatus of claim 1, further comprising a second voltage-to-current converter for the first buck converter, a resistor and an offset current source, wherein the second voltage-to-current converter includes an output, and wherein the output is coupled to the resistor and to the offset current source.

8. The apparatus of claim 1, wherein the first voltage-to-current converter comprises a first operational amplifier and a first resistor.

9. The apparatus of claim 8, wherein the current balancing loop circuit includes a second voltage-to-current converter, the second voltage-to-current converter comprising a second operational amplifier and a second resistor, and wherein an output of the second operational amplifier is connected to an output of the first operational amplifier.

10. A multi-phase buck voltage regulator, comprising:
a first buck converter including a pulse width modulation comparator and a first pair of power transistors connected together at a first switch node;
an offset current source coupled to the pulse width modulation comparator;
a second buck converter including a second pair of power transistors connected together at a second switch node;
a first low pass filter coupled to the first switch node;
a second low pass filter coupled to the second switch node; and
a current balancing loop circuit to receive a filtered output of each of the first and second low pass filters to determine an error by developing a difference between the filtered outputs of the first and second low pass filters, and to generate a current balancing current signal to adjust an output of a first voltage-to-current converter for the second buck converter, the adjusted output of the first voltage-to-current converter configured to adjust a duty cycle of the second buck converter for controlling a current of the second buck converter to track a current of the first buck converter.

11. The multi-phase buck voltage regulator of claim 10, wherein the current balancing loop comprises an error amplifier coupled to the filtered outputs of each of the first and second low pass filters and having an output coupled to a second voltage-to-current converter.

12. The multi-phase buck voltage regulator of claim 10, wherein the first voltage-to-current converter comprises a first operational amplifier and a first resistor.

13. The multi-phase buck voltage regulator of claim 12, wherein the current balancing loop circuit includes a second voltage-to-current converter, the second voltage-to-current converter comprising a second operational amplifier and a second resistor, and wherein an output of the second operational amplifier is connected to an output of the first operational amplifier.

* * * * *